United States Patent [19]
Kojo

[11] Patent Number: 5,918,071
[45] Date of Patent: Jun. 29, 1999

[54] SYSTEM FOR DELETING PRINT JOB CURRENTLY BEING PROCESSED BY PRINTER FOR PRINTOUT FROM MEMORY OF THE PRINTER IN RESPONSE TO EXTERNAL INPUT INSTRUCTION

[75] Inventor: Yoshiyuki Kojo, Yokohama, Japan

[73] Assignee: Canon Kabushiki Kaisha, Tokyo, Japan

[21] Appl. No.: 08/814,315

[22] Filed: Mar. 11, 1997

Related U.S. Application Data

[63] Continuation of application No. 08/140,498, Oct. 25, 1993, Pat. No. 5,706,412.

[30] Foreign Application Priority Data

Oct. 30, 1992 [JP] Japan .................................. 4-315882

[51] Int. Cl.$^6$ .................. G06F 12/06; G06F 3/12
[52] U.S. Cl. .................... 395/852; 395/113; 395/115; 395/670; 395/872
[58] Field of Search .................... 395/670, 671, 395/678, 825, 115, 868, 113, 872, 852

[56] References Cited

U.S. PATENT DOCUMENTS

| | | | |
|---|---|---|---|
| 3,643,227 | 2/1972 | Smith et al. | 340/172.5 |
| 4,441,163 | 4/1984 | Leikam et al. | 364/900 |
| 4,587,629 | 5/1986 | Dill et al. | 364/900 |
| 4,829,468 | 5/1989 | Nonaka et al. | 364/900 |
| 4,839,798 | 6/1989 | Eguichi et al. | 364/200 |
| 5,036,476 | 7/1991 | Yamaguchi et al. | 364/519 |
| 5,146,344 | 9/1992 | Bennett et al. | 358/296 |
| 5,206,735 | 4/1993 | Gauronski et al. | 358/296 |
| 5,220,674 | 6/1993 | Morgan et al. | 395/800 |
| 5,287,434 | 2/1994 | Bain et al. | 395/101 |
| 5,371,888 | 12/1994 | Lehnertz et al. | 395/650 |

FOREIGN PATENT DOCUMENTS

| | | |
|---|---|---|
| 332779 | 9/1989 | European Pat. Off. . |
| 479494 | 4/1992 | European Pat. Off. . |

OTHER PUBLICATIONS

"Page Printer Message Handler", IBM Technical Disclosure Bulletin, vol. 35, No. 5, Oct. 1992, pp. 278, 280.

*Primary Examiner*—Thomas C. Lee
*Assistant Examiner*—Rehana Perveen
*Attorney, Agent, or Firm*—Fitzpatrick, Cella Harper & Scinto

[57] ABSTRACT

In a printing-information processing method and apparatus, print jobs input from outside are sequentially stored in a reception buffer, analysis information of each of the stored print jobs is stored in a page buffer in parallel with the reception of the print jobs, and page data obtained from the stored analysis information is sequentially stored in the frame buffer. At that time, data for assigning deletion of a job input from the outside is also stored. Hence, an assigned print job stored in the reception buffer, or analysis information or page data stored in the page buffer or the frame buffer, respectively, corresponding to the assigned print job is deleted by analyzing the stored data for assigning deletion of a print job.

54 Claims, 7 Drawing Sheets

SYSTEM FOR DELETING PRINT JOB CURRENTLY BEING PROCESSED BY PRINTER FOR PRINTOUT FROM MEMORY OF THE PRINTER IN RESPONSE TO EXTERNAL INPUT INSTRUCTION

This application is a continuation of application Ser. No. 08/140,498, filed Oct. 25, 1993, (now U.S. Pat. No. 5,706,412), allowed.

BACKGROUND OF THE INVENTION

1. Field of the Invention

The present invention relates to a printing-information processing method and apparatus for use in a printer which is provided with buffers for temporarily storing data transmitted from a host.

2. Description of the Related Art

In a conventional apparatus of this kid the printer is provided with a buffer for temporarily storing data transmitted from a host, such as a host computer. Printing processing is executed by analyzing data stored in the buffer, for example by bit-map development processing, and outputting an image signal to a print engine.

In some apparatus, the buffer can spool a plurality of data (or print jobs) transmitted from the host. Some apparatus also have the ability to deletes data stored in a buffer according to an instruction from an operation panel on the main body of the apparatus so that subsequent data can be received.

However, deleting data within the buffer of a conventional apparatus clears all storable regions of the buffer. Hence, when a print job which is when no longer needed is stored with other print jobs in the buffer, succeeding print jobs cannot be processed until unneeded print jobs are output. As a result considerable time is wasted while printing until the succeeding unneeded print jobs are output, also causing a waste of paper. On the other hand, if the above-described deletion processing of the buffer is performed, since the entire buffer is cleared, communication processing for receiving again the needed print jobs from the host is required, and the host must retransmit the needed job, causing a large loss in data processing efficiency.

SUMMARY OF THE INVENTION

The present invention has been made in consideration of the above-described problems.

It is an object of the present invention to provide a printing-information processing method and a printing information processing apparatus, in which an arbitrary print job, from among print jobs sequentially stored in a reception buffer, and data stores in a page buffer and a frame buffer relating to the arbitrary print job can be selectively deleted, based on input data for assigning deletion of a job.

According to one aspect, the present invention relates to a printing-information processing method and apparatus in which data for assigning deletion of an arbitrary print job, input by interrupt from outside, of the apparatus is stored, while print jobs, input from the outside, are sequentially stored in a reception buffer in units of a specific command group. Analysis information corresponding to each of the stored print jobs is stored in a page buffer, and page data obtained from the stored analysis information is sequentially stored in a frame buffer. The stored data for assigning deletion of a job is analyzed and an assigned print job stored in the reception buffer, or analysis information or page data stored in the page buffer or the frame buffer, respectively, corresponding to the assigned print data is deleted.

In the printing-information processing method and apparatus of the present invention, print jobs input from outside are sequentially stored in the reception buffer; analysis information of each of the stored print jobs is stored in the page buffer in parallel with the reception of the print job; and page data obtained from the stored analysis information is sequentially stored in the frame buffer. At that time, since data for assigning deletion of a print job input from the outside is stored, and at least one of the following is deleted an assigned print job stored in the reception buffer, corresponding analysis information stored in the page buffer, or the corresponding page data stored in the frame buffer. Hence, even when a plurality of print jobs are stored in the reception buffer, only the assigned print job can be deleted, and analysis information or page data stored in the page buffer or the frame buffer, respectively, corresponding to the assigned print job can also be deleted.

DESCRIPTION OF THE PREFERRED EMBODIMENTS

First Embodiment

Figure 1:
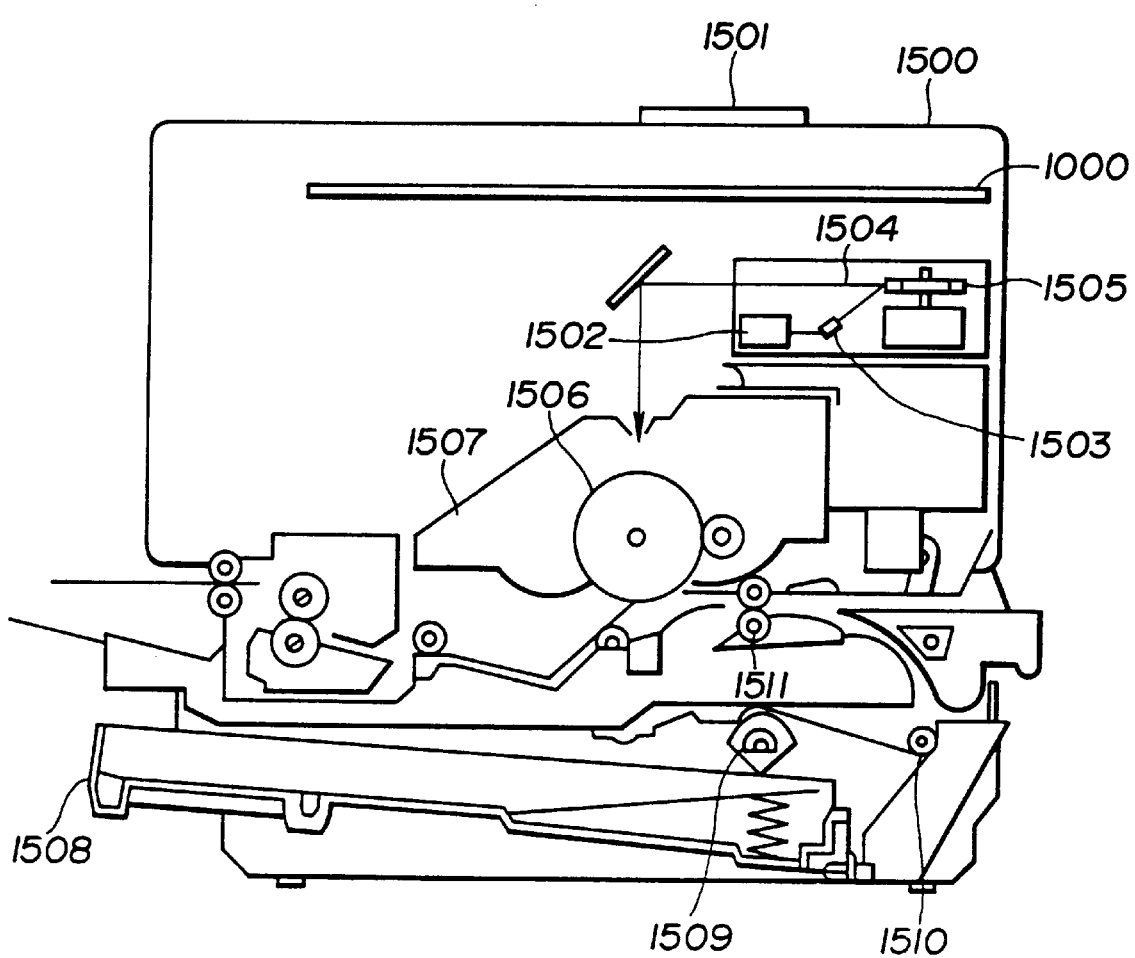
FIG. 1 is a cross-sectional view illustrating a configuration of a printer to which a printing-information processing apparatus of the present invention can be applied.

FIG. 1 is a cross-sectional view illustrating the configuration of a printer to which a printing-information processing apparatus of the present invention can be applied, and illustrate the case of using a laser-beam printer (LBP). The LBP can register character patterns, document forms and the like from a data source (not shown).

In FIG. 1, main body (printer) 1500 of the LBP receives and stores print information (character codes and the like), form information, macro-instructions, and the like supplied from a host computer connected to the LBP. The LBP forms character patterns (generated from character-pattern processing according to the invention) as a form pattern and the like in accordance with the stored information, and forms an image on recording paper, serving as a recording medium. Operation panel 1501 includes switches for operations, an LED (light-emitting diode) display unit, and the like. Printer control unit 1000 controls the entire main body 1500 of the LBP, analyzes character information and the like supplied from the host computer, converts the character information into a video signal representing character patterns, and outputs the video signal to laser driver 1502.

Laser driver 1502 is a circuit for driving semiconductor laser 1503, and switches on and off laser light 1504 emitted from semiconductor laser 1503 in accordance with the input video signal. Laser light 1504 is deflected in directions perpendicular to the plane of FIG. 1 to scan and expose a surface of electrostatic drum 1506. Thus, an electrostatic latent image of character patterns is formed on electrostatic drum 1506. The latent image is developed by developing unit 1507 disposed around electrostatic drum 1506. The developed image is then transferred onto a recording medium such as recording paper. The recording paper comprises cut sheets, which are accommodated within sheet cassette 1508 mounted in main body 1500 of the LBP. Each sheet of the recording paper is conveyed within the apparatus by sheet-feeding roller l509, conveying roller 1510 and conveying roller 1511 and is supplied to electrostatic drum 1506.

Figure 2:
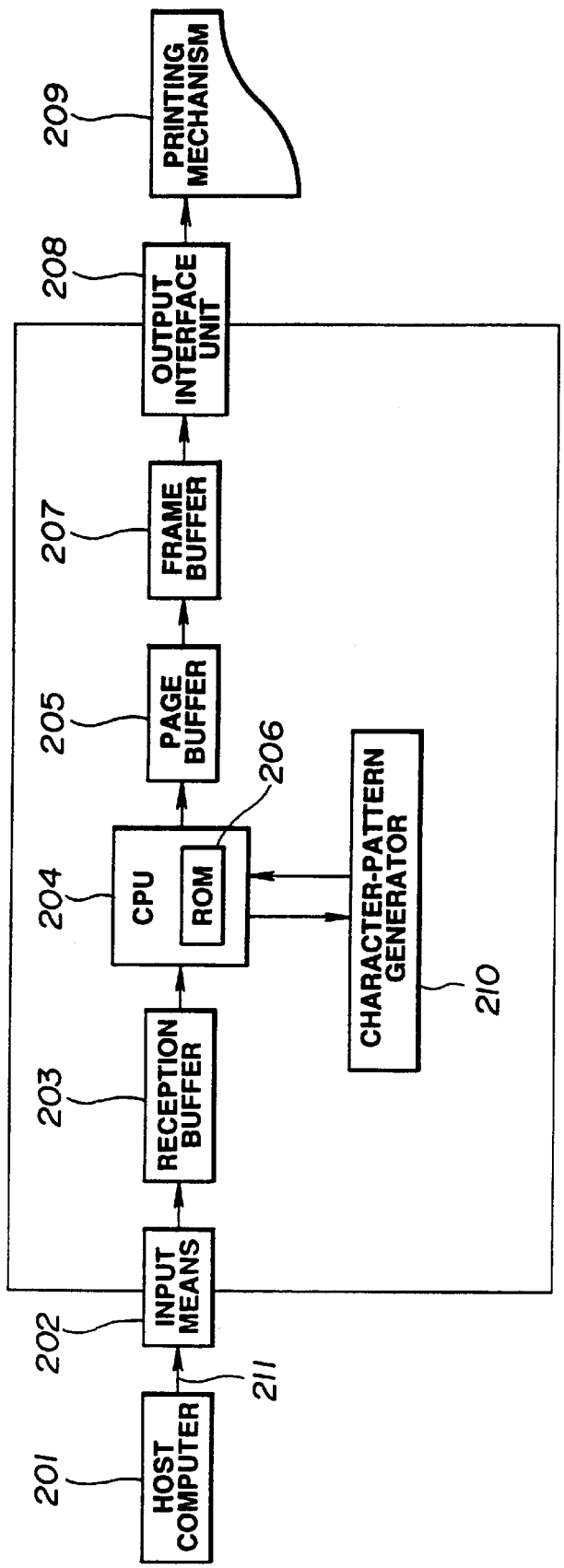
FIG. 2 is a block diagram illustrating the configuration of a printing-information processing apparatus according to an embodiment of the present invention.

FIG. 2 is a block diagram illustrating the configuration of a printing-information processing apparatus according to an embodiment of the present invention.

In FIG. 2 , host computer 201, serving as a generation source of image information, transmit information 211, comprising character-code information, character-font information, form information, macro-registration information and the like, to LBP input means 202 of the LBP. Reception buffer 203 temporarily stores the various kinds of information input from input means 202. Character-pattern generator 210 includes a font ROM (read-only memory) for storing patterns information for respective character codes, and a reading control circuit for the ROM. Character-pattern generator 210 has the code conversion function of calculating the address of a character pattern corresponding to an input character code.

CPU 204 controls the entire control system of the LBP, and controls the entire apparatus by control programs (whose flowcharts will be described later) of CPU 204 stored in ROM 206. Page buffer 205 analyses information stored in reception buffer 203, and stores data obtained by the analysis as intermediate data before image development. Frame buffer 207 stores pattern information developed in character patterns for print images of at least one page. Output interface unit 208 generates a video signal corresponding to the pattern information stored in frame buffer 207, and actuates the interface control of printing mechanism (printer engine) 209. Printing mechanism 209 receives the video signal from output interface unit 208 and prints image information in accordance with the video signal.

In a printing-information processing apparatus having the above-described configuration, if data for assigning deletion of a print job for deleting a desired print job stored in reception buffer 203 is input from an assigning means while print jots input from the outside in units of a specific command group are sequentially stored in reception buffer 203, an analysis means (CPU 204) analyzes each of the print job. The obtained analysis information is stored in page buffer 205, and page data, which is obtained from the stored analysis information, is stored in frame buffer 207. The input data for assigning deletion of a print job is held in RAM (random access memory) (not shown). CPU 204 deletes an assigned print job stored in reception buffer 203 based on the state of registration of the data for assigning deletion of a job in RAM (not shown), or deletes analysis information or page data stored in page buffer 205 or frame buffer 207, respectively, based on the assigned print job. Accordingly, even if a plurality of print jobs are stored in reception buffer 203, it is possible to delete only the assigned print job, as well as analysis information or page data stored in page buffer 205 or frame buffer 207, respectively, corresponding to the assigned print job.

In addition, since data for assigning deletion of a print job for deleting a desired print job stored in reception buffer 203 is input from the operation panel of the main body of the printer, the assignment of deletion of a print job input from the outside can be performed at the side of the main body of the apparatus.

Furthermore, since data for assigning deletion of a print job for deleting a desired print job stored in reception buffer 203 is input from external host computer 201, the assignment of deletion of a print job input from the outside can be performed from the data source.

Figure 3:
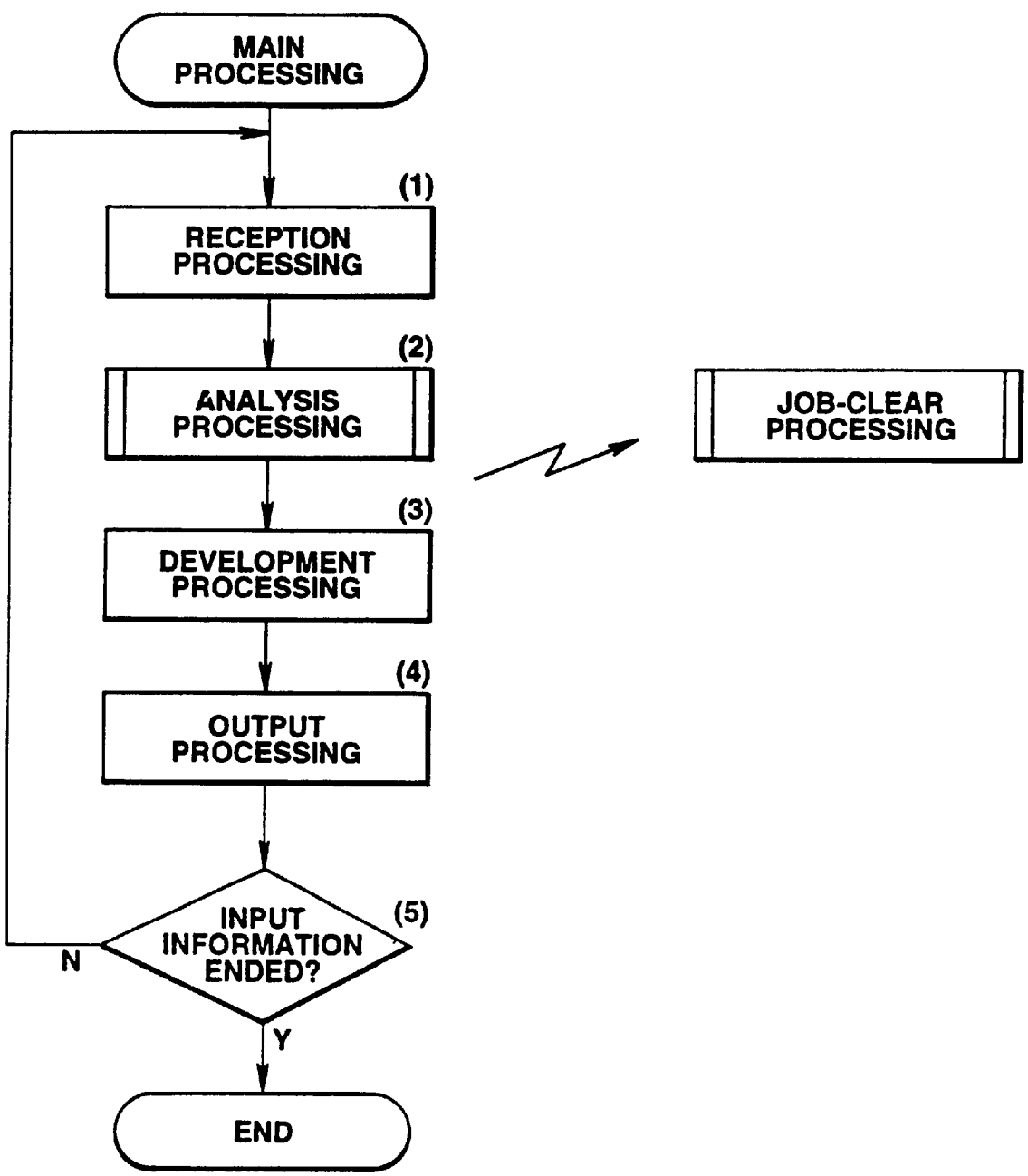
FIG. 3 is a flowchart illustrating a main processing procedure in the printing-information processing apparatus shown in FIG. 2.

First, a description will be provided of the operation of data processing from host computer 201 with reference to FIG. 3.

FIG. 3 is a flowchart illustrating a main processing procedure in the printing-information processing apparatus shown in FIG. 2. Numerals (1)–(5) represent processing steps.

First, reception processing is performed when printing data has been input (step (1)). Upon completion of the reception processing, analysis processing of the printing data is performed (step (2)), and bit-map data development processing is performed (step (3)). Thereafter, output processing of bit-map data is performed and the bit-map data is outputted to a printer engine (not shown) (step (4)). In step (5), it is determined if the input of information has ended. If the result of the determination is negative, the process returns to step (1). If the result of the determination is affirmative, the processing is terminated. While such processing is executed, CIU 204 monitors if an interrupt request of job-clear processing has been entered from the outside through the operation panel or the like. When an interrupt request of job-clear processing has been recognized, job-clear interrupt processing shown in FIG. 4 is started.

Figure 4:
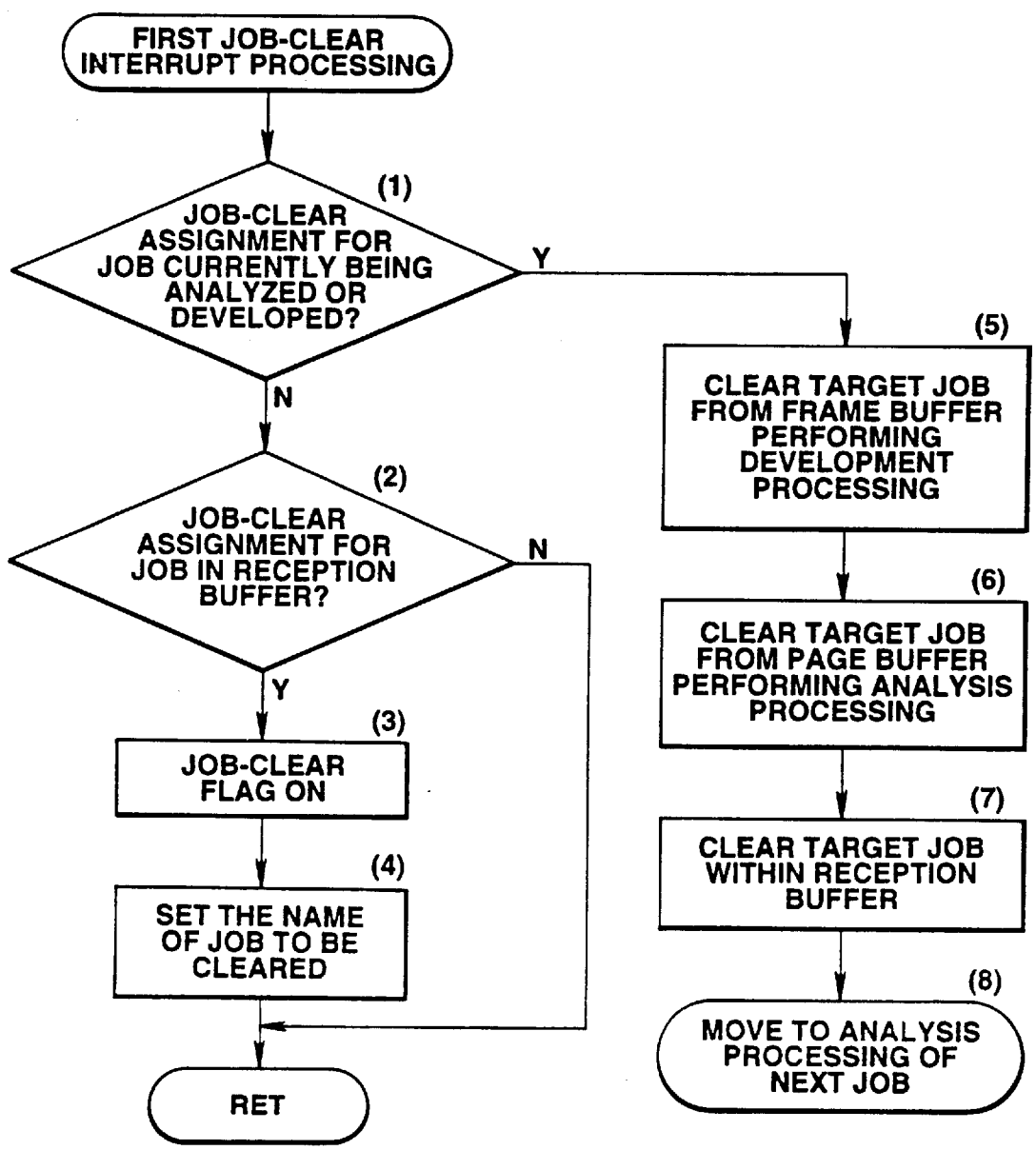
FIG. 4 is a flowchart illustrating the procedure of first job-clear interrupt processing in the printing-information processing apparatus shown in FIG. 2.

FIG. 4 is a flowchart illustrating a procedure of first job-clear interrupt processing in the printing-information processing apparatus of the present invention. Numerals (1)–(8) represent processing steps.

First, it is determined if the print job to be cleared is currently being analyzed, developed or output (step (1)). If the result of the determination is affirmative, date being output is output. At the same time, if data being developed is present in frame buffer 207, that data is cleared (step (5)), If data corresponding to the target print job is present in page buffer 205, that (data is cleared (step (6)). If data corresponding to the target print job is present in reception buffer 203, that data is cleared (step (7)). The process then proceeds to analysis processing of the next print job (step (8)).

If the result of the determination in step (1) is negative, it is determined if the job to be cleared is present in reception buffer 203 (step (2)). If the result of the determination is negative, the process returns to ordinary processing. If the result of the determination is affirmative, a job-clear flag is switched on (step (3)), and the name of the job to be clears is set in an assigned storage area (step (4)). The process then returns to main processing shown in FIG. 3.

Figure 5:
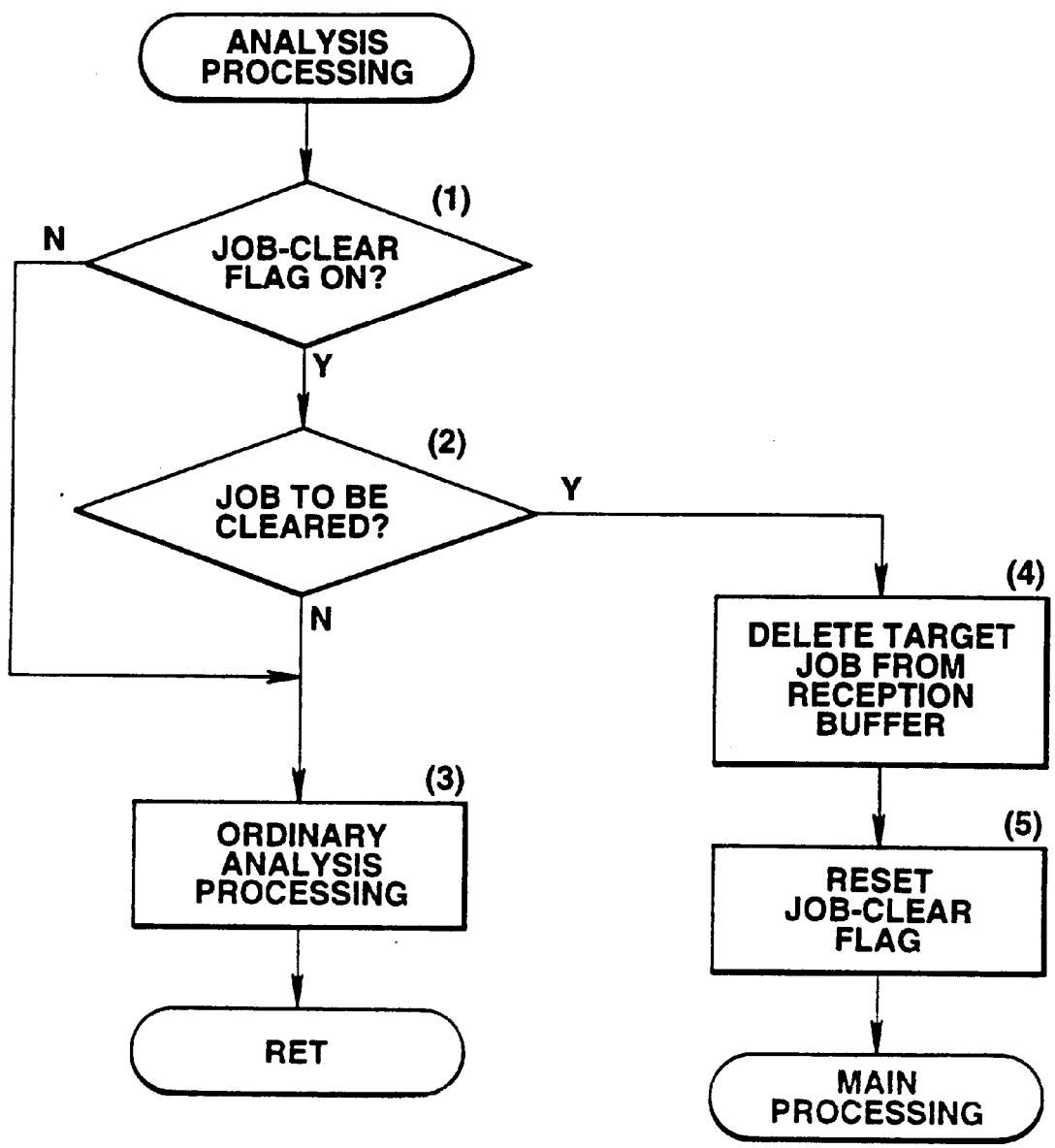
FIG. 5 is a flowchart illustrating a detailed procedure of the analysis processing routine shown in FIG. 3.
Figure 6:
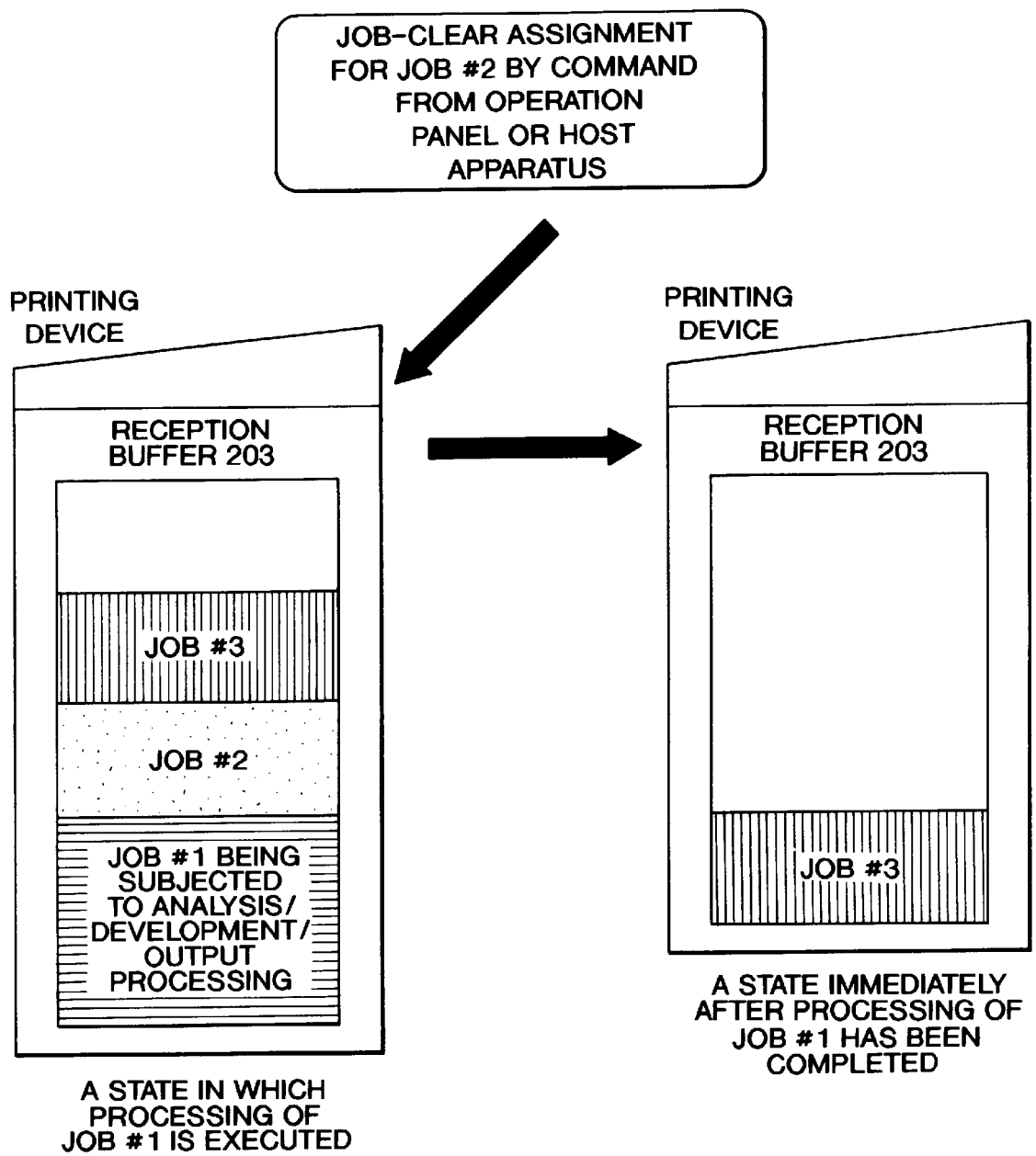
FIG. 6 is a schematic diagram illustrating processing states when deleting an assigned print job using the printing-information processing apparatus of the present invention.

FIG. 5 is a flowchart illustrating a detailed procedure of the analysis processing routine shown in FIG. 3. Numerals (1)–(5) represent processing steps.

First, it is determined if a job-clear flag is switched on according to the flowchart shown in FIG. 4. If the result of the determination is negative, the process proceeds to step (3). where ordinary analysis processing is executed, and the process is terminated.

If the result of the determination in step (1) is affirmative, it is determined if the job transferred from reception buffer 203 is the job to be cleared. This is done by comparing the transferred job with the name of the job set in the storage area (step (2)). If the result of the determination is negative the process proceeds to step (3)). If the result of the determination is affirmative, the target job is deleted from reception buffer 203 (step (4)), the job-clear flag is reset (step (5)), and the process returns to the main processing, Accordingly, as shown in FTC. 6, when a command to clear job #2 has been input to input means 202 from the outside (for example, from the operation panel or from host computer 201, serving as the host apparatus) while jobs #1–#3 are stacked in reception buffer 203 and job #1 is being analyzed, developed and output, printing data for job #2 is deleted after the completion of the processing of job #1. As a result, only print job #3 remains stacked on reception buffer 203, and the processing of analyzing, developing and outputting job #3 is started.

As described above, in the printing-information processing method of the present invention, while print jobs input from the outside are sequentially stored in reception buffer 203, analysis information of each of the stored print jobs is stored in page buffer 205 in parallel to the reception of the print jobs. In addition, page data obtained from the stored analysis information is sequentially stored in frame buffer 207, and data for assigning deletion of a print job input from the outside is stored in RAM (not shown). The assigned print job stored in reception buffer 203, or analysis information or page data stored in page buffer 205 or frame buffer 207, respectively, corresponding to the assigned print job, is deleted by analyzing the stored data for assigning deletion #2 a job. Hence, even if a plurality of print jobs are stored in reception buffer 203, it is possible to delete only the assigned print job, as well as analysis information or page data stored in page buffer 205 or frame buffer 207, respectively, corresponding to the assigned print job.

In the above-described embodiment, a description has been provided of the case in which allocation of data from input means 202 is not performed within reception buffer 203. However, in a printer having a plurality of input means in which data can be allocated in reception buffer 203 so as to correspond to the respective input means, the corresponding input means may be assigned in a job-clear assignment. That is, since print jobs input via respective data input units (not shown) are registered in reception buffer 203 while being allocated by CPU 204, it is possible to delete from reception buffer 203 only the print job input by the assigned data input unit as well as analysis information or page data stored in page buffer 205 or frame buffer 207, respectively, corresponding to the assigned print job.

Second Embodiment

Figure 7:
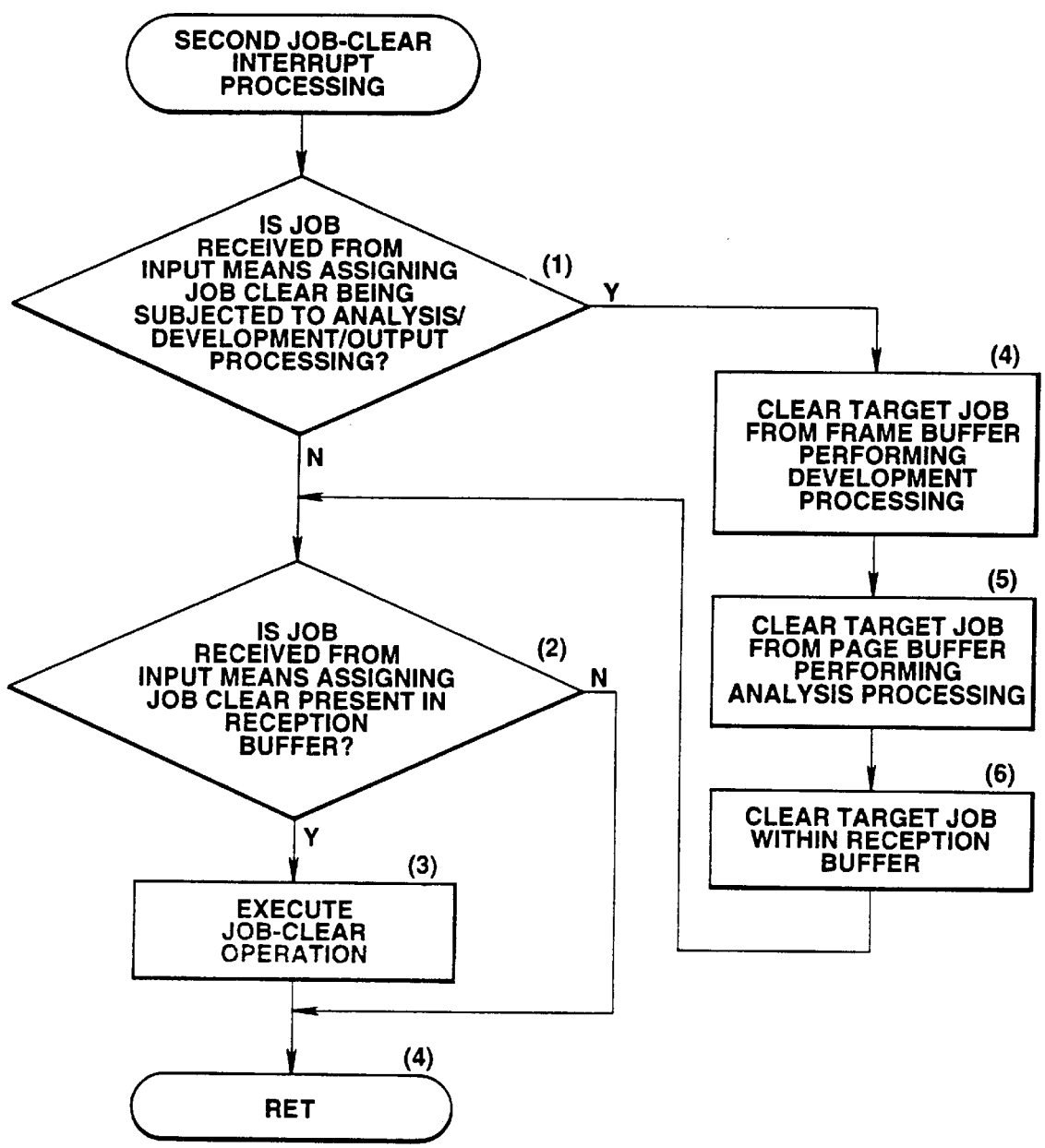
FIG. 7 is a flowchart illustrating the procedure of second job-clear interrupt processing in the printing-information processing apparatus of the invention.

FIG. 7 is a flowchart illustrating the procedure of second job-clear interrupt processing in the printing-information processing apparatus of the present invention. Numerals (1)–(6) represent processing steps When a job-clear interrupt has been received from outside of the main processing shown in FIG. 3, it is determined if the print job, received from input means which assigns job clear is currently being subjected to analysis development/ output processing (step (1)). If the result of the determination is affirmative, in parallel with the processing of outputting printing data, it it is present, the contents of frame buffer 207 performing development processing are cleared (step (4)), the contents of page buffer 205 performing analysis processing are cleared (step (5)), the corresponding job remaining in reception buffer 203 is cleared (step (6)) and the process returns to step (2).

On the other hand, if the result of the determination in step (1), is negative it is determined the corresponding print job is stored in a region of reception buffer 203 corresponding to the input means which assigns job clear (step (2)). If the result of the determination is negative, the process returns to main processing. If the result of the determination is affirmative, the corresponding print job is cleared from reception buffer 203 (step (3)). Thus, the processing is terminated, and the process returns to main processing.

As described above, in the printing-information processing method of the present invention, while print jobs input from the outside are sequentially stored in reception buffer 203, analysis information of each of the stored print jobs is stored in page buffer 205 in parallel to reception of the print jobs, and page data obtained from the stored analysis information is sequentially stored in frame buffer 207, data for assigning deletion of a print job input from the outside is stored. The assigned print job stored in reception buffer 203, or analysis information or page data stored in page buffer 205, or frame buffer 207, respectively, corresponding to the assigned print job is deleted by analyzing the stored data for assigning deletion of a print job. Hence, even if a plurality of print jobs are stored in reception buffer 203, it is possible to delete only the assigned print job, as wall as analysis information or page data stored in page buffer 205 or frame buffer 207, respectively, corresponding to the assigned print job.

In the printing-information processing apparatus of the present invention, if data for assigning deletion of a print job for deleting a desired print job stored in reception buffer 203 is input from an assigning means while print jobs in units of a specific command group input from the outside are sequentially stored in reception buffer 203, analysis means analyzes each of the print jobs. The obtained analysis information is stored in page buffer 205, and page data obtained from the stored analysis information is stored in frame buffer 207. The input data for assigning deletion of a print job is held in holding means. Job deletion means deletes the assigned print job stored in reception buffer 203, or analysis information or page data stored in page buffer 205 or frame buffer 207, respectively, corresponding to the assigned print job based on the state of registration of the job deletion assigning data held in the holding means. Accordingly, even if a plurality of print jobs are stored in reception buffer 203, it is possible to delete only the assigned print job, as well as analysis information or page data stored in page buffer 205 or frame buffer 207, respectively, corresponding to the assigned print job.

In addition, since data for assigning deletion of a print job for deleting all desired print job stored in reception buffer 203 is input from the operation panel of the main body of the printer, the assignment of deletion of a print job input from the outside can be input from a side of the main body of the apparatus.

Furthermore since data for assigning deletion of a print job for deleting a desired print job stored in reception buffer 203 is input from external host computer 201, the assignment of deletion of a print job input from the outside can be performed from the data source.

Since print jobs input from respective data input units are registered in reception buffer 203 while being allocated by registration means it is possible to delete only the print job input from the assigned data input unit from reception buffer 203, as well as analysis information or page data stored in page buffer 205 or frame buffer 207, respectively, corresponding to the assigned print job.

The present embodiment of the invention enables a user to easily select and delete any print job sequentially stored in the reception buffer.

While the present invention has been described with respect to what is presently considered to be the preferred embodiments, the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications, equivalent structures, and functions.

What is claimed is:

1. A printer which deletes a print job in response to an input instruction, the printer comprising:

memory means for storing one or more print jobs to be printed by the printer, and for storing processed print information which comprises a processed print job;

inputting means for inputting an instruction from an external source to delete a print job stored in the memory means; and a processor for determining whether a print job stored in the memory means is currently being processed by the printer for printout thereby, and for deleting the print job currently being processed or processed print information for the print job from the memory means in response to the instruction.

2. A printer which deletes a print job in response to an input instruction, the printer comprising:

a reception buffer which stores one or more print jobs to be printed by the printer;

a page buffer which stores processed print information which comprises a processed print job;

an external interface over which is input an instruction from an external source to delete a print job stored in the reception buffer; and a processor which determines whether the print job stored in the reception buffer which has been assigned for deletion is currently being processed by the printer for printout thereby, and which deletes the print job currently being processed or processed print information for the print job from the page buffer in response to the instruction.

3. A system which receives a print job from a host computer, and which deletes the print job and corresponding analysis information in response to an instruction input from an external source, the system comprising:

a host computer which generates and outputs print jobs; and a printer which receives and prints the print jobs output by the host computer, and which deletes print jobs and corresponding processed print information in response to the instruction input form the external source, the printer comprising:

a reception buffer which stores print jobs to be printed by the printer;

a page buffer which stores processed print information which comprises a processed print job;

an external interface over which is input an instruction from the external source to delete a print job stored in the reception buffer; and a processor which determines whether the print job stored in the reception buffer which has been assigned for deletion is currently being processed by the printer for printout thereby, and which deletes the print job currently being processed or processed print information for the print job from the page buffer in response to the instruction.

4. A printer according to claim 1, wherein said inputting means comprises an operation panel on said printer.

5. A printer according to claim 1, wherein the external source comprises a host computer.

6. A printer according to claim 1, wherein the printer is connected to a host computer having a plurality of data input units, the print jobs being input to the printer via the plurality of data input units, and the printer registers the print jobs in said memory means.

7. A printer according to claim 1, further comprising analysis means for analyzing each print job stored in said memory means, thereby producing analysis information, and wherein said memory means further comprises means for storing said analysis information and pattern data corresponding to said analysis information, said pattern data being generated by said processor.

8. A printer according to claim 7, further comprising image forming means for forming an image in accordance with the pattern data stored in said memory means.

9. A printer according to claim 7, wherein said analysis information stored in said memory means comprises data which is to be processed as bit map data.

10. A printer according to claim 2, wherein said external interface comprises an operation panel on said printer.

11. A printer according to claim 2, wherein the external source comprises a host computer.

12. A printer according to claim 2, wherein the printer is connected to a host computer having a plurality of data input units, the print jobs being input to the printer via the plurality of data input units, and the printer registers the print jobs in said reception buffer.

13. A printer according to claim 2, further comprising:

analysis means for analyzing each print job stored in said reception buffer, thereby producing analysis information, said analysis information being stored in said page buffer; and a frame buffer for storing pattern data obtained from said analysis information, wherein said processor generates said pattern data corresponding to said analysis information.

14. A printer according to claim 13, further comprising image forming means for forming an image in accordance with the pattern data stored in said frame buffer.

15. A printer according to claim 13, wherein said analysis information stored in said page buffer comprises data which is to be processed as bit map data.

16. A system according to claim 3, wherein said external interface comprises an operation panel on said printer.

17. A system according to claim 3, wherein said host computer has a plurality of data input units, the print jobs being input to the printer via the plurality of data input units, and the printer registers the print jobs in said reception buffer.

18. A system according to claim 3, further comprising:

analysis means for analyzing each print job stored in said reception buffer, thereby producing analysis information, said analysis information being stored in said page buffer; and a frame buffer for storing pattern data obtained from said analysis information, wherein said processor generates said pattern data corresponding to said analysis information.

19. A system according to claim 18, further comprising image forming means for forming an image in accordance with the pattern data stored in said frame buffer.

20. A system according to claim 18, wherein said analysis information stored in said page buffer comprises data which is to be processed as bit map data.

21. A printing-information processing method using a printer, the method comprising the steps of:

storing one or more print jobs to be printed by the printer and processed print information which comprises a processed print job in a memory device;

inputting an instruction from an external source to delete a print job stored in the memory device;

determining whether a print job stored in the memory device is currently being processed by the printer for printout thereby; and deleting the print job currently being processed or processed print information for the print job from the memory device in response to the instruction.

22. A printing-information processing method according to claim 21, wherein the instruction is input in said inputting step using an operation panel on said printer.

23. A printing-information processing method according to claim 21, wherein the external source comprises a host computer.

24. A printing-information processing method according to claim 21, wherein the printer is connected to a host computer having a plurality of data input units, the print jobs being input to the printer via the plurality of data input units, and said storing step further comprises registering the print jobs in said memory device.

25. A printing-information processing method according to claim 21, further comprising the steps of:

analyzing each print job stored in said memory device, thereby producing analysis information;

generating pattern data corresponding to said analysis information; and storing said analysis information and pattern data.

26. A printing-information processing method according to claim 25, further comprising the step of forming an image in accordance with the stored pattern data.

27. A printing-information processing method according to claim 25, wherein said analysis information comprises data which is to be processed as bit map data.

28. A printing-information processing method using a printer, the method comprising the steps of:

storing one or more print jobs to be printed by the printer in a reception buffer;

storing processed print information which comprises a processed print job in a page buffer;

inputting, over an external interface, an instruction from an external source to delete a print job stored in the reception buffer;

determining whether the print job stored in the reception buffer which has been assigned for deletion is currently being processed by the printer for printout thereby, and deleting the print job currently being processed or processed print information for the print job from the page buffer in response to the instruction.

29. A printing-information processing method according to claim 28, wherein said external interface comprises an operation panel on the printer.

30. A printing-information processing method according to claim 28, wherein the external source comprises a host computer.

31. A printing-information processing method according to claim 28, wherein the printer is connected to a host computer having a plurality of data input units, the print jobs being input to the printer via the plurality of data input units, and said storing step further comprises registering the print jobs in said reception buffer.

32. A printing-information processing method according to claim 28, further comprising the steps of:

analyzing each print job stored in said reception buffer, thereby producing analysis information;

storing said analysis information in said page buffer;

generating pattern data corresponding to said analysis information; and storing pattern data obtained from said analysis information in a frame buffer.

33. A printing-information processing method according to claim 32, further comprising the step of forming an image in accordance with the pattern data stored in said frame buffer.

34. A printing-information processing method according to claim 32, wherein said analysis information stored in said page buffer comprises data which is to be processed as bit map data.

35. A printing-information processing method comprising the steps of:

providing a host computer which generates and outputs print jobs;

providing a printer which receives and prints the print jobs output by the host computer, and which deletes print jobs and corresponding processed print information in response to an instruction input from an external source;

storing print jobs to be printed by the printer in a reception buffer;

storing processed print information which comprises a processed print job in a page buffer;

inputting, over an external interface, an instruction from the external source to delete a print job stored in the reception buffer;

determining whether the print job stored in the reception buffer which has been assigned for deletion is currently being processed by the printer for printout thereby; and deleting the print job currently being processed or processed print information for the print job from the page buffer in response to the instruction.

36. A printing-information processing method according to claim 35, wherein said external interface comprises an operation panel on said printer.

37. A printing-information processing method according to claim 35, wherein said host computer has a plurality of data input units, the print jobs being input to the printer via the plurality of data input units, and said storing step further comprises registering the print jobs in said reception buffer.

38. A printing-information processing method according to claim 35, further comprising the steps of:

analyzing each print job stored in said reception buffer, thereby producing analysis information;

storing said analysis information in said page buffer;

generating pattern data corresponding to said analysis information; and storing said pattern data in a frame buffer.

39. A printing-information processing method according to claim 38, further comprising the step of forming an image in accordance with the pattern data stored in said frame buffer.

40. A printing-information processing method according to claim 38, wherein said analysis information stored in said page buffer comprises data which is to be processed as bit map data.

41. A computer-readable medium having stored therein computer-executable process steps, the computer-executable process steps comprising:

storing one or more print jobs to be printed by a printer and processed print information which comprises a processed print job in a memory device;

receiving an instruction, input from an external source, to delete a print job stored in the memory device;

determining whether a print job stored in the memory device is currently being processed by the printer for printout thereby; and deleting the print job currently being processed or processed print information for the print job from the memory device in response to the instruction.

42. A computer-readable medium according to claim 41, wherein the instruction is input in said inputting step using an operation panel on said printer.

43. A computer-readable medium according to claim 41, wherein the external source comprises a host computer.

44. A computer-readable medium according to claim 41, wherein the printer is connected to a host computer having a plurality of data input units, the print jobs being input to the printer via the plurality of data input units, and said storing step further comprises registering the print jobs in said memory device.

45. A computer-readable medium according to claim 41, wherein said process steps further comprise:

analyzing each print job stored in said memory device, thereby producing analysis information;

generating pattern data corresponding to said analysis information; and storing said analysis information and pattern data.

46. A computer-readable medium according to claim 45, wherein said process steps further comprise the step of forming an image in accordance with the stored pattern data.

47. A computer-readable medium according to claim 45, wherein said analysis information comprises data which is to be processed as bit map data.

48. A computer-readable medium having stored therein computer-executable process steps, the computer-executable process steps comprising:

storing one or more print jobs to be printed by a printer in a reception buffer;

storing processed print information which comprises a processed print job in a page buffer;

receiving an instruction, input over an external interface, from an external source to delete a print job stored in the reception buffer;

determining whether the print job stored in the reception buffer which has been assigned for deletion is currently being processed by the printer for printout thereby, and deleting the print job currently being processed or processed print information for the print job from the page buffer in response to the instruction.

49. A computer-readable medium according to claim 48, wherein said external interface comprises an operation panel on the printer.

50. A computer-readable medium according to claim 48, wherein the external source comprises a host computer.

51. A computer-readable medium according to claim 48, wherein the printer is connected to a host computer having a plurality of data input units, the print jobs being input to the printer via the plurality of data input units, and said storing step further comprises registering the print jobs in said reception buffer.

52. A computer-readable medium according to claim 48, wherein said process steps further comprise:

analyzing each print job stored in said reception buffer, thereby producing analysis information;

storing said analysis information in said page buffer;

generating pattern data corresponding to said analysis information; and storing pattern data obtained from said analysis information in a frame buffer.

53. A computer-readable medium according to claim 52, wherein said process steps further comprise forming an image in accordance with the pattern data stored in said frame buffer.

54. A computer-readable medium according to claim 52, wherein said analysis information stored in said page buffer comprises data which is to be processed as bit map data.

* * * * *

UNITED STATES PATENT AND TRADEMARK OFFICE
CERTIFICATE OF CORRECTION

PATENT NO. : 5,918,071

DATED : June 29, 1999

INVENTOR(S) : YOSHIYUKI KOJO

It is certified that error appears in the above-identified patent and that said Letters Patent is hereby corrected as shown below:

Cover Page [56] References Cited
   "Eguichi et al." should read --Eguchi et al.--.

COLUMN 1
   Line 27, "deletes" should read --delete--.
   Line 33, "when no" should read --no--.
   Line 53, "stores" should read --stored--.
   Line 59, "outside, of the apparatus" should read
--outside of the apparatus,--.

COLUMN 2
   Line 11, "deleted" should read --deleted:--.

COLUMN 4
   Line 33, "CIU" should read --CPU--.
   Line 44, "date" should read --data--.
   Line 57, "clears" should read --cleared--.

UNITED STATES PATENT AND TRADEMARK OFFICE
CERTIFICATE OF CORRECTION

PATENT NO.  : 5,918,071

DATED       : June 29, 1999

INVENTOR(S) : YOSHIYUKI KOJO

It is certified that error appears in the above-identified patent and that said Letters Patent is hereby corrected as shown below:

COLUMN 5
   Line 10, "FTC." should read --FIG.--.
   Line 32, "#2" should read --of--.
   Line 62, "it it" should read --if it--.

COLUMN 6
   Line 2, "(1), is negative" should read --(1) is negative --; and "the" should read --if the--.
   Line 23, "wall" should read --well--.
   Line 48, "all" should read --a--.

Signed and Sealed this

Eighteenth Day of April, 2000

Q. TODD DICKINSON

Attest:

Attesting Officer

Director of Patents and Trademarks